United States Patent
Nishide et al.

(10) Patent No.: US 7,156,198 B2
(45) Date of Patent: Jan. 2, 2007

(54) ATTACHING STRUCTURE FOR A SEATBELT APPARATUS

(75) Inventors: Harutomi Nishide, Saitama (JP); Mikihito Kojima, Saitama (JP); Makoto Nagai, Saitama (JP); Kazutomo Isonaga, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/646,185

(22) Filed: Aug. 22, 2003

(65) Prior Publication Data

US 2004/0041389 A1   Mar. 4, 2004

(30) Foreign Application Priority Data

Aug. 30, 2002   (JP)   ............................. 2002-252669

(51) Int. Cl.
    *B60K 28/00*   (2006.01)
(52) U.S. Cl. ................. 180/273; 280/801.1; 297/468
(58) Field of Classification Search ............ 280/801.1, 280/803, 805, 806, 807, 808; 73/862.474; 297/468, 469, 482, 483; 180/273
    See application file for complete search history.

(56) References Cited

U.S. PATENT DOCUMENTS

| 5,020,856 | A | * | 6/1991 | George | 297/483 |
| 5,599,070 | A | * | 2/1997 | Pham et al. | 297/483 |
| 5,733,013 | A | * | 3/1998 | Brown | 297/483 |
| 5,873,599 | A | * | 2/1999 | Bauer et al. | 280/806 |
| 6,069,325 | A | * | 5/2000 | Aoki | 177/136 |
| 6,356,200 | B1 | * | 3/2002 | Hamada et al. | 340/667 |
| 6,447,011 | B1 | * | 9/2002 | Vollimer | 280/806 |
| 6,585,325 | B1 | * | 7/2003 | Pal | 297/483 |
| 6,594,571 | B1 | * | 7/2003 | Sakai et al. | 701/45 |
| 6,676,162 | B1 | * | 1/2004 | Gyllenspetz et al. | 280/808 |
| 6,684,718 | B1 | * | 2/2004 | Muraishi | 73/862.474 |
| 6,786,104 | B1 | * | 9/2004 | Aoki | 73/862.472 |
| 2004/0145174 | A1 | * | 7/2004 | Fujii et al. | 280/801.1 |

FOREIGN PATENT DOCUMENTS

| JP | 11-245753 | 9/1999 |
| JP | 2001-187559 | 7/2001 |

* cited by examiner

*Primary Examiner*—Paul N. Dickson
*Assistant Examiner*—Toan C. To
(74) *Attorney, Agent, or Firm*—Carrier, Blackman & Associates, P.C.; Joseph P. Carrier; William D. Blackman

(57) ABSTRACT

An attaching structure for a seatbelt apparatus of a vehicle equipped with a seat, which is supported by a vehicle body through a weight sensor. The seatbelt apparatus includes a buckle, a seatbelt, and a tang. The buckle is fixed to one side of the seat of the vehicle. One end of the seatbelt is fixed at the vehicle so that it allows a length adjustment of the seatbelt, and the other end of the seatbelt is connected to an anchor that is fixed to the other side of the seat. The tang is provided at the seatbelt and is engaged with the buckle so as to hold an occupant to the seat. Here, the anchor and the buckle are fixed at a position higher than the weight sensor.

5 Claims, 5 Drawing Sheets

ATTACHING STRUCTURE FOR A SEATBELT APPARATUS

BACKGROUND OF THE INVENTION

1. Field of the Invention

The present invention relates to an attaching structure for a seatbelt apparatus of a vehicle equipped with a seat, which is supported by a vehicle body through a weight sensor.

2. Description of Relevant Art

In the conventional three-point support type seatbelt apparatus (hereinafter indicated as seatbelt apparatus), one end of a seatbelt is stored in a retractor, which adjusts the length of a seatbelt by allowing the pull-out/take-up of the seatbelt. The other end of the seatbelt is fixed to a vehicle floor that is in the vicinity of the side-part of a vehicle seat. In this seatbelt apparatus, the seatbelt is guided by a slip guide positioned on a level with a shoulder of a vehicle seat.

The seatbelt has a tang placed between the slip guide and the seatbelt-anchor. When using this seatbelt apparatus, the tang is engaged with a buckle fixed to the vehicle floor that is in the vicinity of the other side-part of the vehicle seat. Thereby, the occupant sitting on the seat (vehicle seat) is held by the seatbelt that is supported at three points (the slip guide, the seatbelt-anchor, and the buckle).

Generally, the seatbelt is used for holding the occupant on the seat. But, the seatbelt apparatus is also used in order to fix a child seat to the vehicle seat.

In the conventional seatbelt apparatus, the pull-out and take-up of the seatbelt is managed in compliance with the prescribed operation mode. In other words, the adjustment of the length of the seatbelt is managed in compliance with the prescribed operation mode. Here, a term "pull-out" means that the pulling out of the seatbelt stored in the retractor, in order to lengthen the length of the seatbelt. A term "take-up" means that the storing of the seatbelt into the retractor in order to shorten the length of the seatbelt. As an example of the operation mode, an emergency lock mode and an auto lock mode can be cited.

Here, the adjustment of the length of the seatbelt is managed based on the emergency lock mode, when collision with another vehicle occurs and the seatbelt is pulled at a speed of more than a threshold speed. That is, this emergency lock mode is performed in order to protect the occupant against injury by holding the occupant by the seatbelt.

On the other hand, the adjustment of the length of the seatbelt is managed based on the auto lock mode, when fixing the child seat to the vehicle seat. In this mode, the pull-out of the seatbelt is forbidden and the take-up of the seatbelt is allowed. Thereby, the child seat is firmly fixed at the vehicle seat without causing the stagger of the child seat.

As an example of these types of the seatbelt, the seatbelt apparatus disclosed in Japanese unexamined patent publication JP H11-245753 can be cited.

Recently, a vehicle seat equipped with a weight sensor that measures a weight of an occupant has been widely spread. These types of the vehicle seat are also widely adopted in the intelligent control of the equipments of the vehicle.

When the child seat is fixed to the vehicle seat equipped with the weight sensor utilizing the auto lock mode, the child seat is pushed against the vehicle seat by the tension of the seatbelt (hereinafter a belt tension) that is caused in the region between the seatbelt-anchor and the buckle. In this occasion, since the seatbelt-anchor is fixed at the lower part of the vehicle body, the child seat is pushed downwardly by the belt tension.

In this occasion, since the force (load), which pushes the child seat against the vehicle seat, acts on the weight sensor, the weight sensor also detects the load caused by the belt tension in addition to the weight of the occupant and the child seat.

Thus, this may give a lower reliability of the detection result of the weight sensor. Thereby, the miss operation of the airbag may be caused when the deployment of the airbag is controlled based on the detection result of the weight sensor.

Therefore, the attaching structure of a seatbelt apparatus, which can prevent the occurrence of the detection error that occurs when the weight of the occupant is measured by the weight sensor, has been required.

SUMMARY OF THE INVENTION

The present invention relates to an attaching structure for a seatbelt apparatus of a vehicle equipped with a seat, which is supported by a vehicle body through a weight sensor. In this invention, a seatbelt-anchor is fixed to a member, which is positioned nearer to the seat than the weight sensor.

In the present invention having these constructions, the seatbelt-anchor is fixed to a member that is positioned nearer to the seat than the weight sensor. Thereby, the load caused by the mounting of the child seat is not applied to the weight sensor. Thus, the weight of an occupant sitting on the seat is accurately measured.

In the present invention, it is preferable that a buckle, which is engaged with/disengaged from a tang of the seatbelt apparatus, is fixed to a member positioned nearer to the seat than the weight sensor.

That is, the buckle, which fixes the seatbelt at the other side of the seat with respect to the seatbelt-anchor, is fixed to the member that is positioned nearer to the seat than the weight sensor. Thereby, since the unfavorable load is not applied to the weight sensor, the weight sensor can measure the weight of the occupant more accurately.

DETAILED DESCRIPTION OF THE PREFERRED EMBODIMENT

The preferred embodiment of the present invention will be explained with reference to the attached drawings.

Figure 1:
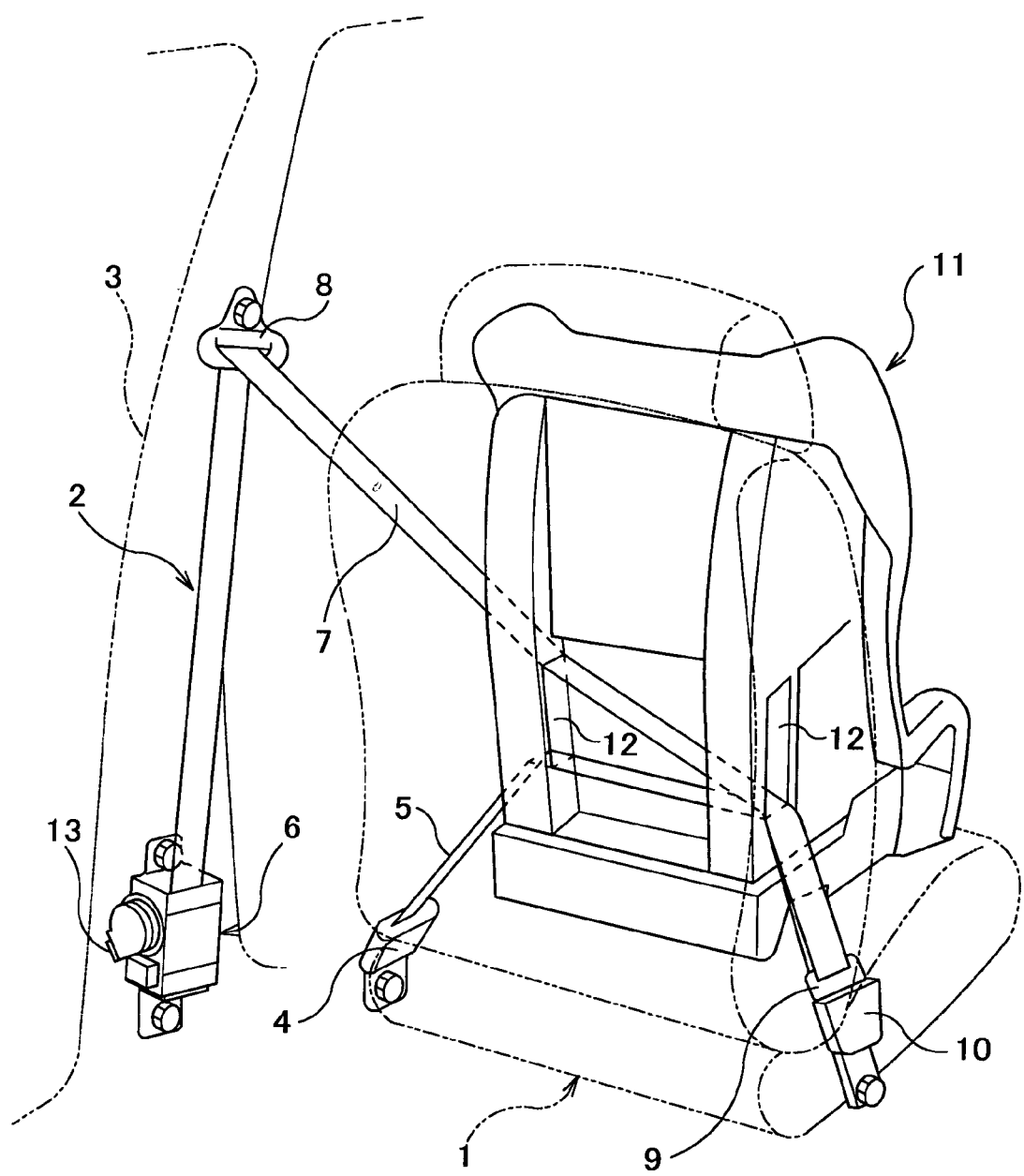
FIG. 1 is a perspective view looking at a seatbelt apparatus from an upper rear direction.

As shown in FIG. 1, a seatbelt apparatus 2 provided at a seat 1 of a vehicle includes a seatbelt-anchor 4, a lap belt 5, a retractor 6, a shoulder belt 7, a slip guide 8, a tang 9, and a buckle 10.

In this seatbelt apparatus 2, one end of the lap belt 5 is connected to a seatbelt-anchor 4, which is provided at the outside (door side) in the vicinity of the bottom of the seat 1. The other end of the lap belt 5 is connected to the tang 9, which is engaged to or disengaged from the buckle 10. This buckle 10 is provided at the center side in the vicinity of the bottom of the seat 1.

To be more precise, the seatbelt-anchor 4 is provided at the door-side near the bottom of the seat 1. The buckle 10 is provided at the cabin-center side near the bottom of the seat 1. One end of the lap belt 5 is connected to the seatbelt-anchor 4, the other end of the lap belt 5 is connected to the shoulder belt 7 through the tang 9.

One end of the shoulder belt 7 is connected to a retractor 6 provided at under side of a center pillar 3. This retractor 6 allows the pull-out and take-up of the shoulder belt 7 from the retractor 6. The other end of the shoulder belt 7 is connected to the lap belt 5 through the tang 9 after passing through the slip guide 8 disposed at the upside of the center pillar 3.

The rear of the backrest of a child seat 11 is provided with belt insertion-holes 12 and 12, which are formed at both sides in the width directions of the child seat 11. When the tang 9, the lap belt 5, and the shoulder belt 7 are passed through the belt insertion-holes 12 and 12 and the tang 9 is connected to the buckle 10, the child seat 11 is stably placed on the seat 1.

The retractor 6 is allowed to switch the operation mode between an emergency lock mode and an auto lock mode.

The emergency lock mode is used in order to hold the occupant on the seat 1 by the seatbelt apparatus 2. In this emergency lock mode, generally, the pull-out and take-up of the shoulder belt 7 from the retractor 6 is allowed in order to permit the change of the sitting posture of the occupant. In this emergency lock mode, on the other hand, the pull-out or take-up of the shoulder belt 7 is forbidden in the event of the a side collision with another vehicle. In other words, the adjustment of the length of the shoulder belt 7 is allowed in the usual state, but the adjustment of the length of the shoulder belt 7 is not allowed when the shoulder belt 7 is pulled at a speed of greater than a threshold value.

The auto lock mode is used when mounting the child seat 11 on the seat 1 using the seatbelt apparatus 2.

In this auto lock mode, the take-up of the shoulder belt 7 is allowed and the pull-out of the shoulder belt 7 is forbidden. Thereby, the child seat 11 is firmly fixed at the seat 1. In other words, the shortening of the length of the shoulder belt 7 is allowed in the usual state, but the lengthening of the length of the shoulder belt 7 is not allowed in order to fix the child seat 11 to the seat 1 firmly.

A limit switch 13, provided on the retractor 6, is used for detecting the present operation mode, such as auto lock mode, by the retractor 6.

Figure 2:
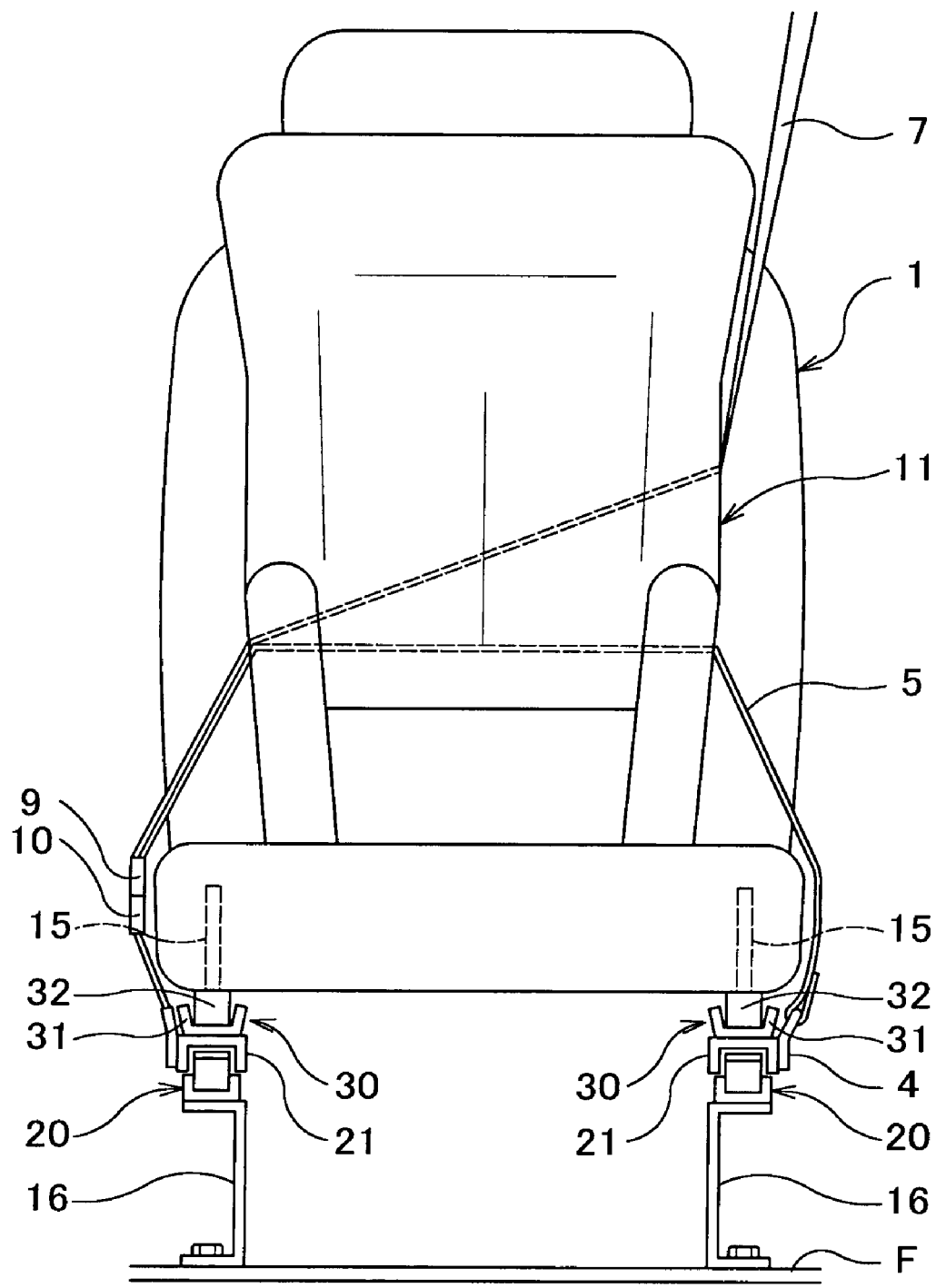
FIG. 2 is a front view of the seatbelt apparatus.
Figure 3:
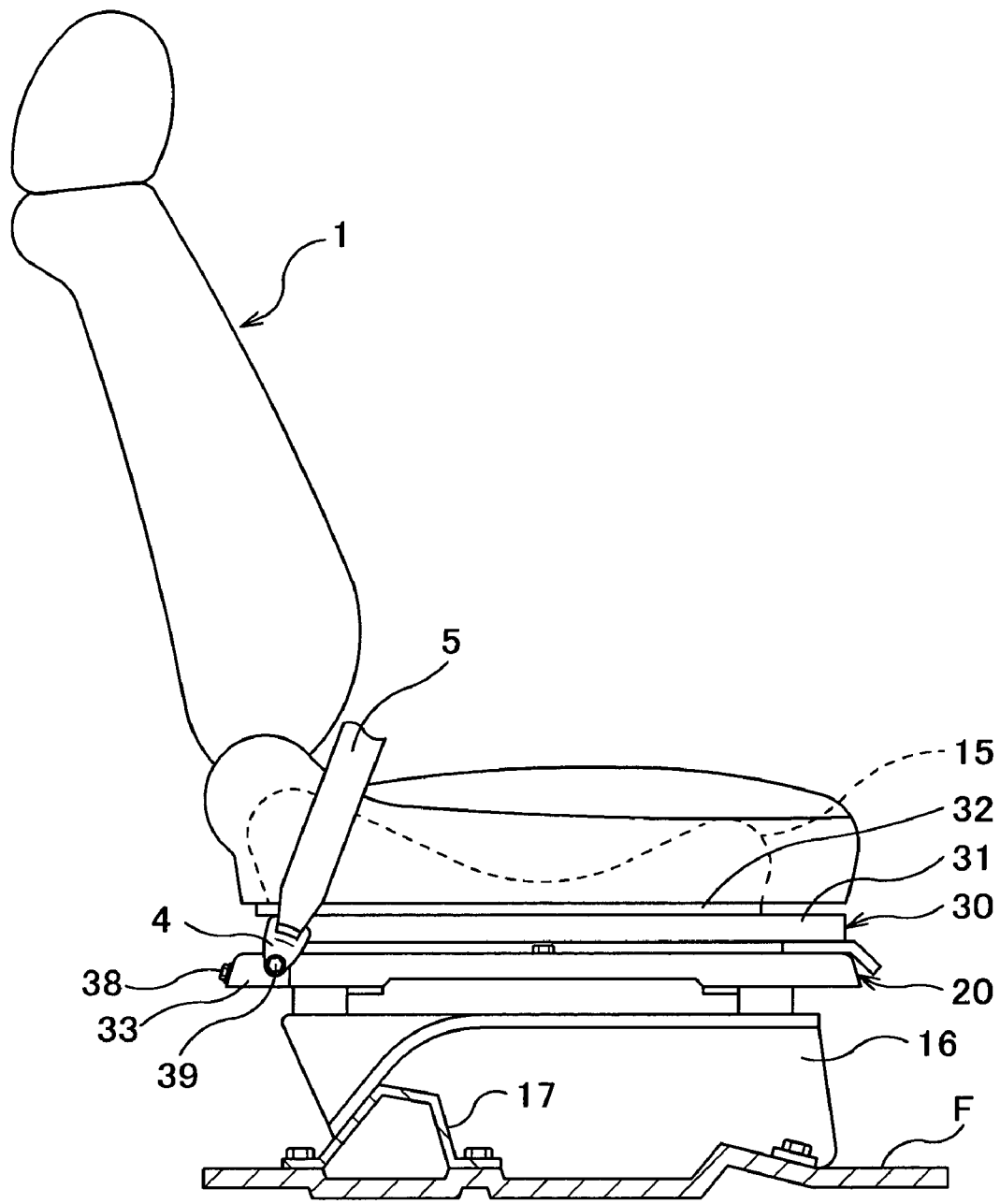
FIG. 3 is a side view of the seatbelt apparatus.

As shown in FIG. 2 and FIG. 3, the seat 1 is fixed to a floor F of the vehicle body through a weight detection unit 20.

Plates 15 and 15 that constitute the frame of the seat part of the seat 1 are provided at both sides along the fore-and-rear directions with respect to the seat 1. Each of the plates 15 is connected to each of movable sliders 32 of a slidable mechanism 30.

A rail 31, which is a stationary member of the slidable mechanism 30, is fixed on the weight detection unit 20. The weight detection unit 20 is fixed to a pair of seat-fixing brackets 16. The seat 1 is fixed to the vehicle body by connecting each of the seat-fixing brackets 16 to the floor F. In other words, the seat 1 is supported by the floor F, through the slidable mechanism 30, the weight detection unit 20, and the seat-fixing brackets 16. Here, the rear-side end of each seat-fixing bracket 16 is connected to the floor F through a sub-bracket 17 (FIG. 3).

Figure 4:
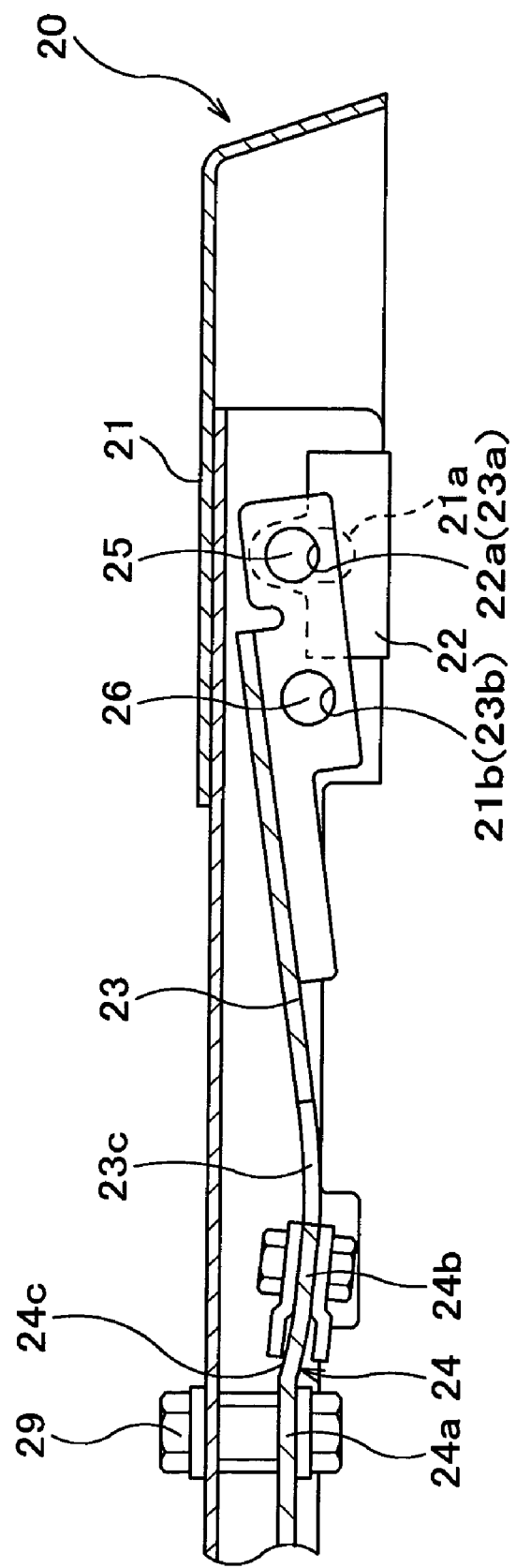
FIG. 4 is a cross-sectional view of a weight detection unit.

As shown in FIG. 4, the weight detection unit 20 is composed of a base plate 21 connected to the seat 1 through the slidable mechanism 30, a bracket 22 acts as a load acceptor, an arm 23 acts as a load transmitter, and a sensor plate 24 acts as a load detector. Here, FIG. 4 shows the state wherein the arm 23 and the sensor plate 24 are deformed in compliance with a load applied to the seat 1.

The base plate 21 is a long member, which is a U-like shaped member in sectional viewing. In other words, the base plate 21 is formed by bending both ends in the width direction of the rectangular plate so that a depression part is formed inside thereof Here, this bent end part is defined as side-part.

The base plate 21 accommodates the bracket 22, the arm 23, and the sensor plate 24 in the depression part, and hence the base plate functions as an accommodator.

A long-hole 21a and a pin-hole 21b are formed at both side-parts of the base plate 21. A bracket pin 25, which connects the arm 23 with the bracket 22, is inserted into the long-hole 21a, and a center pin 26, which serves as a rotation axis of the arm 23, is inserted into the pin-hole 21b.

The bracket 22 is a member of having a wide grounding area at the bottom thereof and receives a load when the load is applied to the seat 1. This bracket 22 also has a bracket-hole 22a through which the bracket pin 25 is inserted in order to connect the bracket 22 to the arm 23.

The arm 23 has side-wall at the end part in the longitudinal directions of the arm 23. A bracket-hole 23a, through which the bracket pin 25 is inserted, and a pin-hole 23b, through which the center pin 26 is inserted, are provided on the side-wall. A notched part is formed on the other end part of the arm 23 50 that a pair of convection parts 23c is formed at the sensor plate 24 side of the arm 23.

The sensor plate 24 has a pair of a displacement parts 24b at both sides of a fixing part 24a. The displacement part 24b and the fixing part 24a are connected through a path 24c, which has a smaller width and thickness than both of the displacement part 24b and the fixing part 24a. Here, in FIG. 4, only one side of the sensor plate 24 is indicated.

Each path 24c has two strain gages (not shown) thereon. The position where the strain gages are provided is the vicinity of the displacement part 24b and the vicinity of the fixing part 24a. Here, each of strain gages is joined by electric wiring so that a bridge circuit is provided.

The displacement part 24b is fixed at the convection part 23c of the arm 23 by a bolt.

Thereby, when the load is applied to the bracket 22 and the arm 23 is displaced, the displacement part 24b is also displaced.

In this occasion, the electrical resistances of each strain gage varies depending on the tensile force (load) and the compressive force (load), which are caused by the displacement of the displacement part 24b. That is, the electrical resistance of the bridge circuit itself varies depending on the degree of the variation of the electrical resistance of each strain gage.

In the present invention, therefore, the amount of displacement of the displacement part 24b, i.e. the amount of the load (weight) to be applied to the seat 1 can be obtained by measuring the electrical resistance of the bridge circuit.

In the present embodiment, it is preferable that the bridge circuit has a thermistor (not shown) at the position between the strain gages that are placed on the path 24c.

A control unit (not shown) that controls the sensor plate 24 is equipped with a CPU and ROM, and is fixed at the seat-fixing bracket 16. The control unit supplies an electric current to the bridge circuits of the weight detection unit 20, and measures the electric current that is supplied from the weight detection unit 20 after passing through the bridge circuit.

Then, the control unit computes the variations of the resistance value of the strain gage based on the electric current supplied to the bridge circuit and the electric current supplied from the bridge circuit. Next, the control unit generates the output signal based on the result of the computing. The output signal is supplied to respective control units such as a control unit of an airbag apparatus or a control unit of an indicator on the instrument panel.

As shown in FIG. 2 and FIG. 4, when arranging the weight detection unit 20 to the seat 1, the bracket 22 is positioned at a lower-side and the base plate 21 is positioned at an upper-side. Then, the bracket 22 is connected to the seat-fixing bracket 16 and the base plate 21 is connected to the rail 31.

In this weight detection unit 20, the sensor plate 24 and the arm 23 act as a weight detection sensor. That is, the weight (load) applied to the seat 1 is measured by the sensor plate 24 and the arm 23.

As can be seen from FIG. 2, the seatbelt-anchor 4 of the seatbelt apparatus 2 is fixed to the base plate 21 of the weight detection unit 20, which is disposed at the outer side (door side) of the vehicle. The position where the seatbelt-anchor 4 is fixed is in the vicinity of the rear-side end of the base plate 21 (FIG. 3).

The buckle 10 is fixed to the base plate 21 of the weight detection unit 20, which is disposed at the center-side (not the door side) of the vehicle. The position where the buckle 10 is connected is in the vicinity of the rear-side end of the base plate 21 (FIG. 3).

In the present embodiment, as described above, the seatbelt-anchor 4 and the buckle 10 are fixed to the members, which are positioned nearer to the seat 1 side than the weight detection unit 20. To be more precise, the seatbelt-anchor 4 and the buckle 10 are fixed to the members that do not affect the weight detection sensor (the sensor plate 24 and the arm 23) of the weight detection unit 20.

In the present invention, the undesirable load caused by the tensile force (the belt tension) of the lap belt 5 is not added to the weight detection unit 20 (the weight detection sensor), as long as the seatbelt-anchor 4 and the buckle 10 are fixed to the members, which are positioned at the seat 1 side with respect to the weight detection unit 20 (the sensor plate 24 and the arm 23).

In other words, the undesirable load caused by the tensile force of the lap belt 5 is not added to the weight detection unit 20, as long as the seatbelt-anchor 4 and the buckle 10 are fixed to the members, such as the base plate 21, the slidable mechanism 30 disposed above the base plate 21, and the plate 15.

In the present invention, still furthermore, the detection error of the weight of the occupant measured by the weight detection unit 20 can be minimized, as long as the seatbelt-anchor 4 is fixed to the members that are positioned nearer to the seat 1 than the sensor plate 24 and the arm 23, even if the buckle 10 is fixed at the floor of the vehicle.

In the present invention, additionally, it is preferable that the seatbelt-anchor 4 is fixed to the movable members (the movable sliders 32 or the plate 15) of the slidable mechanism that are positioning at higher position than the slidable mechanism 30. This is because the seatbelt-anchor 4 can slide in compliance with the slide of the seat 1.

Figure 5:
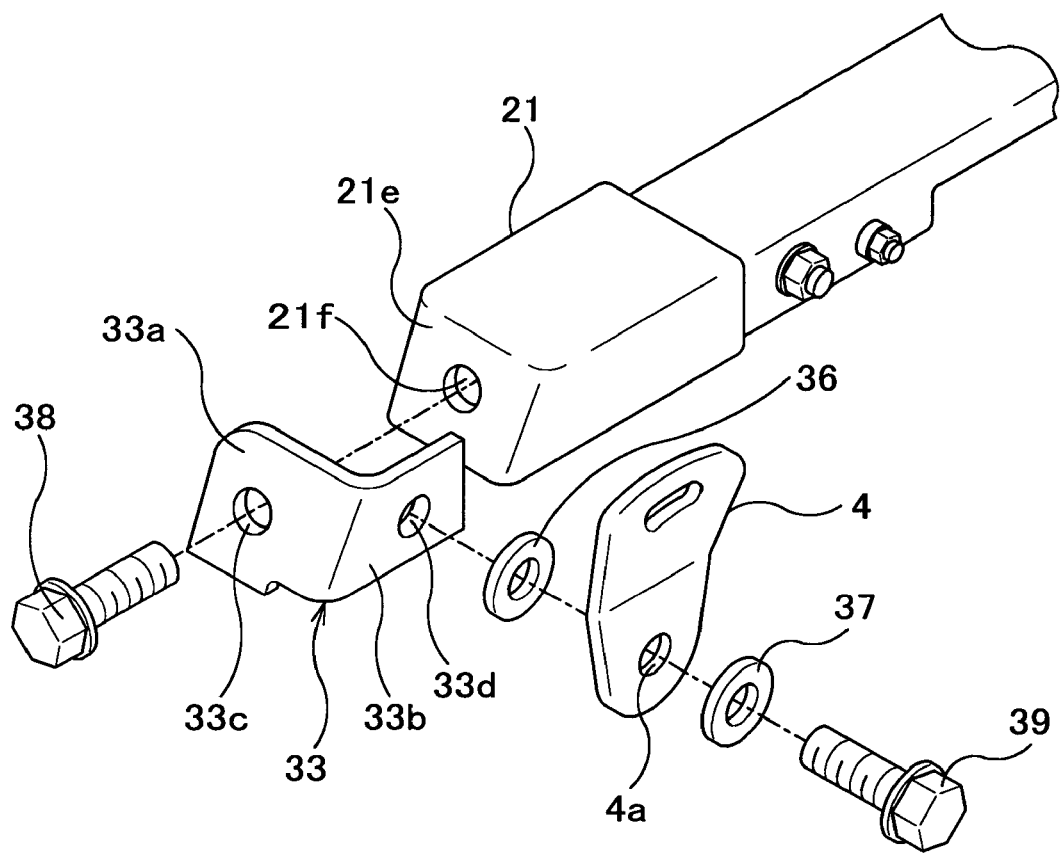
FIG. 5 is an exploded perspective view of an attaching structure between the seatbelt-anchor and the base plate according to the invention.

In the present invention, as shown in FIG. 5, the seatbelt-anchor 4 is fixed to the base plate 21 through an anchor mounter 33. The base plate 21 has a bracket mounting surface 21e, whose surface faces the slanting upward direction when the base plate 21 is provided on the vehicle. A bolt insertion-hole 21f is bored on the bracket mounting surface 21e.

The anchor mounter 33 is composed of a fastening part 33a and a mounting part 33b, which are united into a single piece. The fastening part 33a is fitted together with the bracket mounting surface 21e when fixing the seatbelt-anchor 4 to the base plate 21. The mounting part 33b is disposed at one end of the fastening part 33a so that the mounting part 33b extends along the base plate 21.

This anchor mounter 33 is formed by bending a plate member into L-like shape. The fastening part 33a has a bolt-hole 33c, through which a bolt 38 is inserted. The mounting part 33b has a screw-hole 33d, to which a bolt 39 is screwed in order to fix the seatbelt-anchor 4 to the base frame, when fixing the seatbelt-anchor 4 to the base plate 21. The seatbelt-anchor 4 has a bolt-hole 4a through which the bolt 39 is inserted.

In the present embodiment, the seatbelt-anchor 4 is fixed to the anchor mounter 33, by inserting and screwing the bolt 39 in order of: a washer 37, the bolt-hole 4a, a spacer 36, and the screw-hole 33d, after arranging these parts in order of: the anchor mounter 33, a spacer 36, the seatbelt-anchor 4, and a washer 37.

Then, the anchor mounter 33 is attached to the bracket mounting surface 21e of the base plate 21 by the bolt 38. Thereby, the fixation of the seatbelt-anchor 4 to the base plate 21 is completed.

In the present embodiment, the seatbelt-anchor 4 is fixed to the base plate 21 through the anchor mounter 33, which has a fastening part 33a facing the rearward direction with respect to the vehicle body and which is easily attached to the base plate 21 from the rearward of the base plate 21. Thereby, the fixing operation of the seatbelt-anchor 4 to the base plate 21 is easily performed from the rearward with respect to the seat 1 by using the tools, such as a driver and a wrench.

That is, if the seatbelt-anchor 4 is directly attached to the side surface of the base plate, the fixing operation of the seatbelt-anchor 4 to the base plate 21 is disturbed by the weight detection unit 20 or the like. Therefore, in the present invention, the anchor mounter 33, to which the seatbelt-anchor 4 is mounted and which is attached to the base plate 21 from the rear-side of the base plate 21, is adopted.

Thereby, the attaching (fixing) operation of the seatbelt-anchor 4 to the base plate 21 is easily performed. This is because the seatbelt-anchor 4 is easily attached to the base plate 21 by attaching the anchor mounter 33 to the base plate 21 from the rearward with respect to the seat 1, after fixing the seatbelt-anchor 4 to the mounting part 33b of the anchor mounter 33.

Although there has been disclosed what is the present embodiment of the invention, it will be understood by persons skilled in the art that variations and modifications may be made thereto without departing from the scope of the invention, which is indicated by the appended claims.

In the present invention, the seatbelt-anchor 4 may be fixed to any position as long as the seatbelt-anchor 4 is fixed to the members, which are positioned nearer to the seat 1 than the weight detection unit 20. For example, the seatbelt-anchor 4 may be attached to the frame member of the seat 1 when the weight detection unit 20 is arranged in the condition that the weight detection unit 20 is upside down with respect to the arranging manner that is shown in FIG. 3.

In the preset invention, the weight detection unit 20 is fixed to the stationary member. But the weight detection unit 20 may be fixed to the movable slider 32. In this case, since the weight detection unit (weight sensor) is positioned at the higher position, the seatbelt-anchor 4 is fixed to the frame of the seat.

What is claimed is:

1. An attaching structure for a seatbelt apparatus for a vehicle equipped with a seat, which is supported by a vehicle body through a weight sensor, comprising:
    a seatbelt-anchor is fixed to a seat supporting member, which is positioned between the weight sensor and the seat, wherein
    the weight sensor includes
    a detector which measures a load applied to the seat, and
    an accommodator which stores the detector at an underside thereof, and
    wherein the accommodator constitutes part of said seat supporting member, and the seatbelt-anchor is connected to the accommodator through a first bracket, the first bracket comprising a mounting part that allows the first bracket to be fixed to the accommodator from a rear-side direction with respect to the seat.

2. An attaching structure for a seatbelt apparatus for a vehicle according to claim 1, further comprising
    a buckle, which is engaged with and disengaged from a tang of the seatbelt apparatus, and is fixed to another seat supporting member, which is positioned between the weight sensor and the seat, wherein the buckle is connected to an accommodator of said another seat supporting member through a second bracket, the second bracket comprising a mounting part that allows the second bracket to be fixed to the accommodator from a rear-side direction with respect to the seat.

3. An attaching structure for a seatbelt apparatus for a vehicle according to claim 1, wherein said seat supporting member is a part of the weight sensor which is not affected by a load applied to the seat.

4. An attaching structure for a seatbelt apparatus for a vehicle equipped with a seat, which is provided on a vehicle body through a weight sensor, wherein
    the seatbelt apparatus includes:
    a buckle
    a seatbelt, one end of the seatbelt is adapted to be fixed to the vehicle so that it allows adjustment of the length of the seatbelt, and the other end of the seatbelt is connected to an anchor that is adapted to be fixed to one side of the seat; and
    a tang, which is provided on the seatbelt and operatively engages with the buckle so as to hold an occupant to the seat, wherein
    the anchor and the buckle are adapted to be fixed at positions nearer to the seat than the weight sensor,
    wherein the weight sensor includes
    a detector which measures a load applied to the seat, and
    an accommodator which stores the detector at an underside thereof, wherein
    the seat has a pair of weight sensors at both sides thereof, wherein the anchor is adapted to be fixed to a rear end of the accommodator of one said weight sensor which is located at the outer side with respect to the vehicle body, and the other end of the seatbelt is adapted to be fixed to a rear end of the accommodator of the other said weight sensor which is located at the inner side with respect to the vehicle body, the rear end faces of the accommodators corresponding to faces which face the rear of the vehicle;
    the buckle is adapted to be connected to said accommodator through a bracket, which has a mounting part that allows fixation of the bracket to the accommodator from a rear-side direction with respect to the seat.

5. An attaching structure for a seatbelt apparatus for a vehicle equipped with a seat, which is provided on a vehicle body through a weight sensor, wherein
    the seatbelt apparatus includes:
    a buckle;
    a seatbelt, wherein one end of the seatbelt is adapted to be operatively connected to the vehicle so that it allows adjustment of the length of the seatbelt, and the other end of the seatbelt is connected to an anchor that is adapted to be fixed to the other side of the seat; and
    a tang, which is provided on the seatbelt and operatively engages with the buckle so as to hold an occupant to the seat, wherein
    the anchor and the buckle are adapted to be fixed to a seat support structure at positions between the seat and the weight sensor, wherein
    the weight sensor includes
    a detector which measures a load to be applied to the seat, and
    an accommodator which stores the detector at underside thereof and constitutes part of the seat support structure, wherein
    the buckle is adapted to be fixed to a rear end of the accommodator, the rear end face corresponding to a face which faces the rear of the vehicle; and wherein the seat has a pair of weight sensors at both sides thereof;
    the anchor is adapted to be fixed to a rear end of the accommodator of one said weight sensor which is located at the outer side with respect to the vehicle body, and the buckle is adapted to be fixed to a rear end of the accommodator of the other said weight sensor which is located at the inner side with respect to the vehicle body; and
    the buckle and the anchor are respectively adapted to be connected to said accommodator through a bracket, which has a mounting part that allows fixation of the bracket to the accommodator from a rear-side direction with respect to the seat.

* * * * *